(12) United States Patent
Wallin et al.

(10) Patent No.: US 11,808,873 B2
(45) Date of Patent: Nov. 7, 2023

(54) SYSTEMS AND METHODS FOR LOCATING TAGGED OBJECTS IN REMOTE REGIONS

(71) Applicant: WESTERN WASHINGTON UNIVERSITY, Bellingham, WA (US)

(72) Inventors: David Wallin, Bellingham, WA (US); Andrew Bunn, Bellingham, WA (US); John Lund, Bellingham, WA (US)

(73) Assignee: WESTERN WASHINGTON UNIVERSITY, Bellingham, WA (US)

( * ) Notice: Subject to any disclaimer, the term of this patent is extended or adjusted under 35 U.S.C. 154(b) by 0 days.

(21) Appl. No.: 17/995,399

(22) PCT Filed: Mar. 31, 2021

(86) PCT No.: PCT/US2021/025124
§ 371 (c)(1),
(2) Date: Oct. 3, 2022

(87) PCT Pub. No.: WO2021/202691
PCT Pub. Date: Oct. 7, 2021

(65) Prior Publication Data
US 2023/0123690 A1  Apr. 20, 2023

Related U.S. Application Data

(60) Provisional application No. 63/005,091, filed on Apr. 3, 2020.

(51) Int. Cl.
*G01S 5/02* (2010.01)
*G01S 5/00* (2006.01)

(52) U.S. Cl.
CPC ........ *G01S 5/02521* (2020.05); *G01S 5/0081* (2013.01); *G01S 5/0264* (2020.05)

(58) Field of Classification Search
CPC .......................................... G01S 5/0252–02529
See application file for complete search history.

(56) References Cited

U.S. PATENT DOCUMENTS

| 7,899,006 B2 * | 3/2011 | Boyd | H04W 64/00 370/328 |
| 2007/0168127 A1 * | 7/2007 | Zaruba | A61B 5/0538 701/500 |

(Continued)

OTHER PUBLICATIONS

International Preliminary Report and Written Opinion dated Oct. 13, 2022, issued in corresponding international Application No. PCT/US2021/025124, filed Mar. 31, 2021, 11 pages.

(Continued)

*Primary Examiner* — Cassi J Galt
(74) *Attorney, Agent, or Firm* — CHRISTENSEN O'CONNOR JOHNSON KINDNESS PLLC

(57) ABSTRACT

Systems and methods for locating tagged objects in remote regions are presented herein, in one embodiment, a method of locating tagged objects in remote regions includes creating a signal strength probability density map by. The method also includes transmitting first packets of data from at least one first tag to a plurality of stations and determining, by a plurality of stations, received signal strength indicator (RSSI) for received first packets of data. The method also includes transmitting, by the plurality of stations, the RSSI to an uplink node; and transmitting, by the uplink node, the RSSI to a database. The method further includes determining, by the database, the signal strength probability density map representative of probabilistic locations of the at least one first tag; and transmitting second packets of data from a second tag to the plurality of stations. Based on the signal strength probability density map and the second packets of data from the second tag, a location of the second tag is determined.

19 Claims, 15 Drawing Sheets

(56) References Cited

U.S. PATENT DOCUMENTS

| | | |
|---|---|---|
| 2008/0231453 A1 | 9/2008 | Corder |
| 2010/0090899 A1 | 4/2010 | Zhao et al. |
| 2011/0025464 A1* | 2/2011 | Geng .................. H04W 64/00 340/10.1 |
| 2011/0260869 A1* | 10/2011 | Gagnon ................ G08B 13/08 340/572.1 |
| 2014/0327521 A1 | 11/2014 | Chen et al. |
| 2015/0105099 A1 | 4/2015 | Luo et al. |
| 2015/0168543 A1 | 6/2015 | Tian et al. |
| 2016/0139238 A1 | 5/2016 | Bekkal et al. |
| 2019/0239025 A1 | 8/2019 | Keal |
| 2019/0302231 A1 | 10/2019 | Kuzbari et al. |

OTHER PUBLICATIONS

International Search Report and Written Opinion, dated Jul. 7, 2021 in corresponding International Application No. PCT/US2021/025124 filed Mar. 31, 2021, 11 pages.

Extended European Search Report dated Jul. 26, 2023, issued in corresponding European Application 21780415, filed Mar. 31, 2021, 8 pages.

* cited by examiner

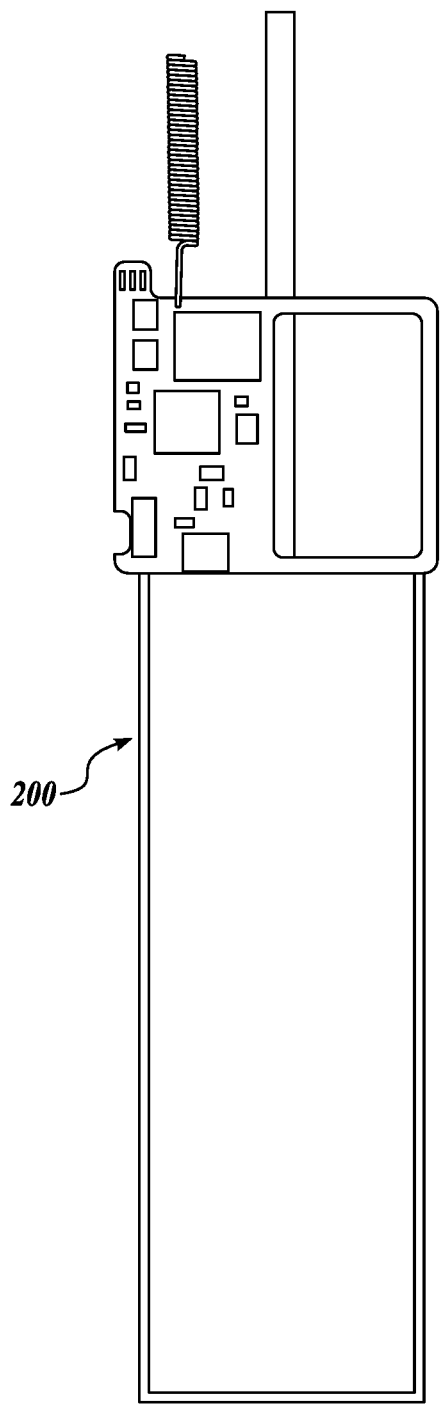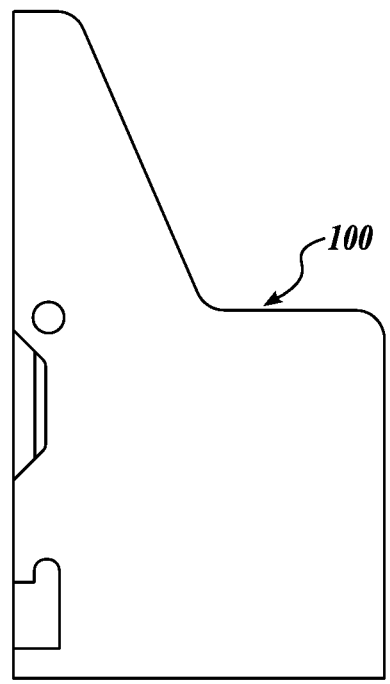
FIG. 1A
FIG. 1B

SYSTEMS AND METHODS FOR LOCATING TAGGED OBJECTS IN REMOTE REGIONS

CROSS-REFERENCES TO RELATED APPLICATIONS

This application is a National Stage of International Application No. PCT/US2021/025124 filed Mar. 31, 2021, which claims the benefit of U.S. Provisional Application No. 63/005,091 filed Apr. 3, 2020, the disclosures of which are incorporated herein in their entirety.

BACKGROUND

The challenge of tracking and locating objects was aided by the development of global navigation satellite systems (GNSS) implemented in the past forty years. Such systems allow a device on the surface of the earth to receive satellite radio signals and triangulate its location from the phase and arrival times of the satellite radio signals. This enables GNSS-equipped devices (e.g., a global positioning system or GPS-equipped devices) to be aware of their own location. Next, such devices may further communicate via a separate radio system to provide location information to external infrastructure. Commercial devices currently exist which rely upon this mechanism of identifying the location of a tracking tag by deploying a GNSS receiver and a radio transmitter on a location tag. However, GPS devices are still relatively expensive and/or power hungry. The power consumption of GPS devices becomes especially important for the location tags designed to indicate location of a lost or buried person without access to additional source of power.

Some other conventional technologies rely on the strength of radio signal to determine a location of the source of signal. An advantage of such system is that a semiconductor radio (also referred to as a silicon radio) is inexpensive and consumes low power, therefore not having the battery draining issues. However, the location of the transmitter may be hard to determine based on just the signal strength at the point of the receiver. For example, a difference between a received signal of −124 dB and −125 dB may correspond to a 2 km difference in location.

Some conventional technologies use time-of-arrival to determine location of a tag. However, a time-of-arrival approach requires accurate timekeeping within the system, which makes this technology expensive. Furthermore, modulation strategies employed by inexpensive long-range radios to achieve high noise margins and multipath resistance further impairs the accuracy of time-of-arrival methods. Accordingly, a need still remains for accurate, low power location systems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Briefly, the inventive technology is directed to reliable and accurate determination of the position of radio transceiver-based electronic tags. In at least some embodiments, the transmitter tags do not require GNSS receivers for determining tags' locations. Furthermore, the inventive technology can locate the tags in regions that do not have established communication or power infrastructure.

In some embodiments, the transmitter tags (for simplicity and brevity referred to as "tags") may include receivers, forming inexpensive, low power, long range transceivers, enabling potentially ubiquitous implementation that is otherwise not possible given the cost of the GNSS receiver, and battery and power management that support it.

In some embodiments, the system includes a plurality of mesh-networked base stations (also referred to as "stations" for simplicity and brevity) that are installed ad hoc, but spatially distributed in a deliberate manner to preserve mesh network connectivity. These stations each have a known location, either through a GNSS receiver installed on the station or through logging the station location at the time of installation. The stations are capable of receiving data from the tags, and of sending data to and from other stations within the mesh network. The stations are also capable of collecting and recording received signal strength indicator (RSSI) data on the transmissions.

Within the radio range of the mesh network of stations there is at least one station capable of transmitting data to and from a broader communications network (this station hereafter referred to as the "uplink"). The communication uplink could be cellular, WiFi, satellite, etc. In some embodiments, the uplink is further capable of executing operations of any other station in addition to data communication with an external network.

In operation, tags send an identifying signal that can be received by the stations. Between sending signals, tags may sleep to conserve power and wake up periodically to transmit a packet of data containing identifying information. When this packet of data is received by one or more nearby base stations, each station logs the tag ID as well as RSSI information. This signal strength information may then be transmitted across the mesh network of stations and eventually propagated to the uplink. The uplink transmits collected data to a data storage and processing system that may be separate from the station and tag network. Some non-limiting examples of such data storage and processing systems include pre-processing and processing computers and databases like raw data databases, computed probability density function (PDF) maps, etc.

In some embodiments, the data storage and processing system (for simplicity and brevity referred to as the "database") generates RSSI-based reverse beaconing for localization by constructing and adapting a predictive regional signal map based on data received by tags, geospatial modeling and remote sensing data. These regional signal maps are generated for a given region and may be continuously refined through incoming tag data augmented by remote sensing information and by the GNSS-enabled training tags, if available in the system. The regional signal maps may be probability density function (PDF) based maps of curvilinear (non-circular) lines of RSSI of several base stations. In operation, the curvilinear lines of RSSIs of individual base station are probabilistically triangulated to define a PDF location of the tag.

In some embodiments, the system has additional functionality that further refines RSSI-based positioning, including the ability to temporarily command all capable tags in a region to function as beacons (transmitters), as well as the ability to force higher frequency bi-directional (forward and reverse, i.e., transceiver) RSSI beaconing when a specific tag is sought.

In some embodiments, the operation of the inventive systems and methods may be described with respect to two different usage scenarios of the tags. Under the first usage scenario, the tags are used for the system calibration resulting in the PDF maps. As explained above, these PDF maps may be understood as predictive regional signal map based on data received from the tags, geospatial modeling and remote sensing data. In some embodiments, the tags are referred to as the "first tags" with reference to this usage scenario.

Under the second usage scenario, the tags are attached to tracked persons, animals or objects. Signal strength, tag location, meteorological data, etc. are used to map these tags on a given PDF map of a particular area. In some embodiments, the tags are referred as the "second tags" with reference to this usage scenario.

In one embodiment, a method of locating tagged objects in remote regions, including creating a signal strength probability density map by: transmitting first packets of data from at least one first tag to a plurality of stations, determining, by a plurality of stations, received signal strength indicator (RSSI) for received first packets of data, transmitting, by the plurality of stations, the RSSI to an uplink node, transmitting, by the uplink node, the RSSI to a database, and determining, by the database, the signal strength probability density map representative of probabilistic locations of the at least one first tag. The method also includes transmitting second packets of data from a second tag to the plurality of stations; and based on the signal strength probability density map and the second packets of data from the second tag, determining a location of the second tag.

In one aspect, transmitting the first packets of data from at least one first tag to the plurality of stations includes: waking the at least one first tag from a low power sleep state; and after transmitting the first packets of data, entering the low power sleep state by the at least one first tag.

In one aspect, the first packets of data sent by at least one first tag include: an identifier; a timestamp; a global positioning system (GPS) location; and orientation data. In one embodiment, the method also includes commanding the at least one first tag to function as a beacon. In one aspect, the at least one first tag and the second tag are radio transceiver tags.

In one aspect, the method also includes bi-directionally communicating between at least one station of the plurality of stations and the second tag. In another aspect, the method also includes determining orientation of individual first tags by their respective 3-axis accelerometers.

In one aspect, transmitting, by the plurality of stations, the RSSI to an uplink node includes: receiving the RSSI by a first station of the plurality of stations; transmitting the RSSI from the first station of the plurality of stations to a second station of the plurality of stations; and transmitting the RSSI from the second station of the plurality of stations to the uplink.

In one aspect, determining the signal strength probability density map includes: determining a raw signal strength contour profile of the at least one first tag as received by the plurality of stations; determining an individual tag radiation pattern of the at least one first tag; determining an adjusted station signal profile based on a combination of the raw signal strength contour profile of the at least one first tag and the individual tag radiation pattern of the at least one first tag.

In one aspect, determining the individual tag radiation pattern of the at least one first tag is based on a tag magnetometer or a tag accelerometer data.

In one aspect, determining, by the database, the signal strength probability density map representative of probabilistic locations of the at least one first tag includes: generating, by the database, individual probability density maps for each station of the plurality of stations; and intersecting the individual probability density maps of each station of the plurality of stations to generate the signal strength probability density map representative of probabilistic locations of the at least one first tag.

In one aspect, the method also includes: receiving, by the database, environmental and satellite imaging data; and refining the signal strength probability density map based on the environmental and satellite imaging data.

In one embodiment, a system of locating tagged objects in remote regions, includes: at least one first tag configured to transmit first packets of data; a plurality of stations configured to receive the first packets of data and to determine received signal strength indicator (RSSI) for the received packets of data; an uplink node configured to receive the RSSIs from the plurality of stations; a database configured to receive the RSSIs and to determine a signal strength probability density map based on the received RSSIs; and at least one second tag configured to transmit second packets of data to the plurality of stations. The database is configured to determine a location of the second tag based on the signal strength probability density map and the second packets of data transmitted by the second tag.

In one embodiment, the first packets of data sent by each first tag include: an identifier; a timestamp; a global positioning system (GPS) location; and orientation data.

In one aspect, at least one station of the plurality of stations is configured for bi-directional communication with the second tag.

In another aspect, the at least one first tag is configured to enter a low power sleep state after transmitting the first packets of data.

In one aspect, individual stations of the plurality of stations and the uplink node are housed in weatherproof enclosures.

In one aspect, individual stations of the plurality of stations include 3-axis accelerometers for determining orientation of the station.

In one aspect, the database is further configured to: determine a raw signal strength contour profile of the at least one first tag as received by the plurality of stations; determine an individual tag radiation pattern of the at least one first tag; determine an adjusted station signal profile based on a combination of the raw signal strength contour profile of the at least one first tag and the individual tag radiation pattern of the at least one first tag.

In one aspect, the individual tag radiation pattern of the at least one first tag is based on a tag magnetometer or a tag accelerometer data.

In one aspect, the database is further configured to: generate individual probability density maps for each station of the plurality of stations; and intersect the individual probability density maps of each station of the plurality of stations to generate the signal strength probability density map representative of probabilistic locations of the at least one first tag.

DESCRIPTION OF THE DRAWINGS

The foregoing aspects and many of the attendant advantages of this inventive technology will become more readily appreciated as the same become better understood by reference to the following detailed description, when taken in conjunction with the accompanying drawings, wherein:

FIGS. 1A and 1B are side views of a base station and a tag, respectively, in accordance with embodiments of the present technology;

DETAILED DESCRIPTION

Example devices, methods, and systems are described herein. It should be understood the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood aspects of the present disclosure, as generally described herein, and illustrated in the figures, can be arranged, substituted, combined, separated, and designed in a wide variety of different configurations, all of which are explicitly contemplated herein.

FIGS. 1A and 1B are side views of a base station 200 and a tag 100, respectively, in accordance with embodiments of the present technology. In some embodiments, the station 200 may include weatherproof enclosure and/or energy harvesting source (e.g., solar panel, wind turbine, etc.) that prolongs operation of the station. In normal operation, the tag 100 is carried by a person (e.g., a hiker, skier, etc.) or an object that needs to be located (e.g., a snowmobile, a terrain vehicle, etc.). Tags 100 and stations 200 are capable of radio communication, as further explained below.

Figure 2A:
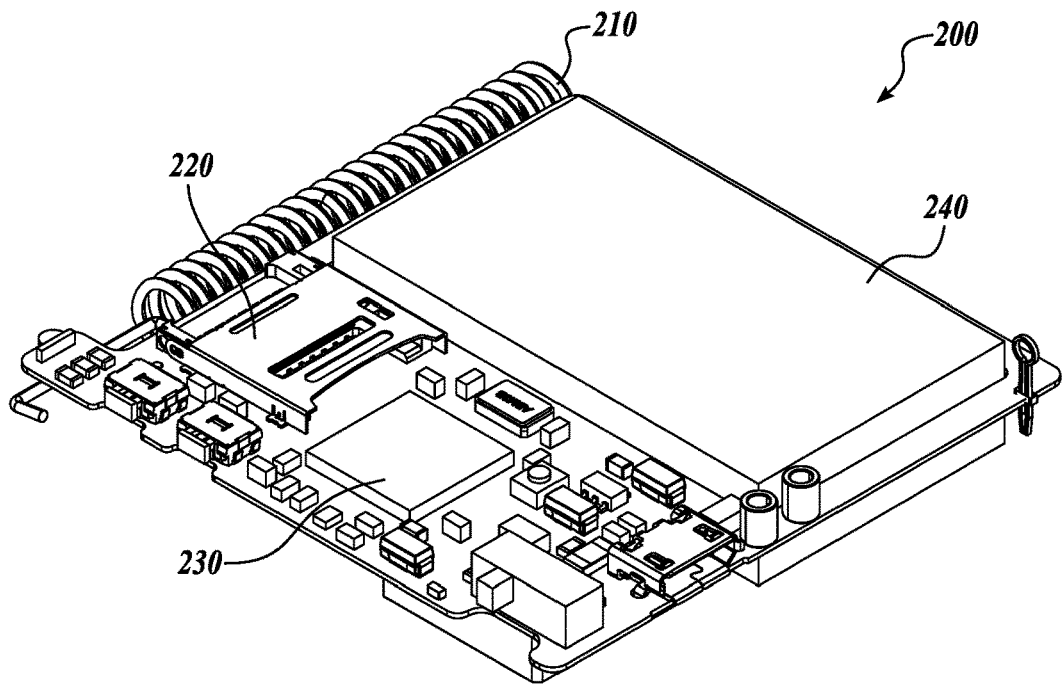
FIGS. 2A and 2B are isometric top and bottom views, respectively, of a printed circuit board (PCB) assembly of a base station in accordance with embodiments of the present technology.
Figure 2B:
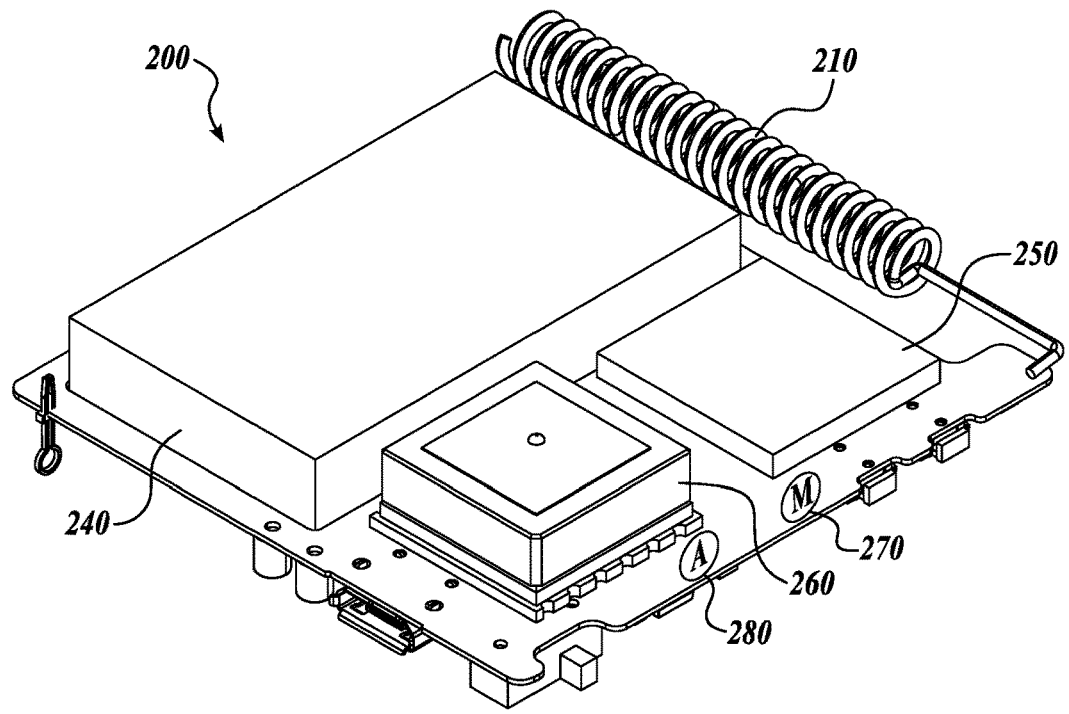

FIGS. 2A and 2B are isometric top and bottom views, respectively, of a printed circuit board (PCB) assembly of a base station 200 in accordance with embodiments of the present technology. In some embodiments, the station 200 includes an antenna 210, a memory slot 220 suitable for receiving memory chips, a controller 230, a battery 240, a radio module 250 and a GNSS module 260 (also referred to as a "GPS module" for simplicity even though GNSS may include other global positioning systems). The station 200 may include an accelerometer 280 and/or magnetometer 270 that identify a relative orientation of the station. In some embodiments, the accelerometer 280 may be a 3-axis accelerometer. The illustrated PCB assembly may also include battery charging electronics, power regulation electronics, passives, etc. Other implementations of the station's PCB architecture are also possible, the illustrated PCB assembly being just one possible design.

Figure 3A:
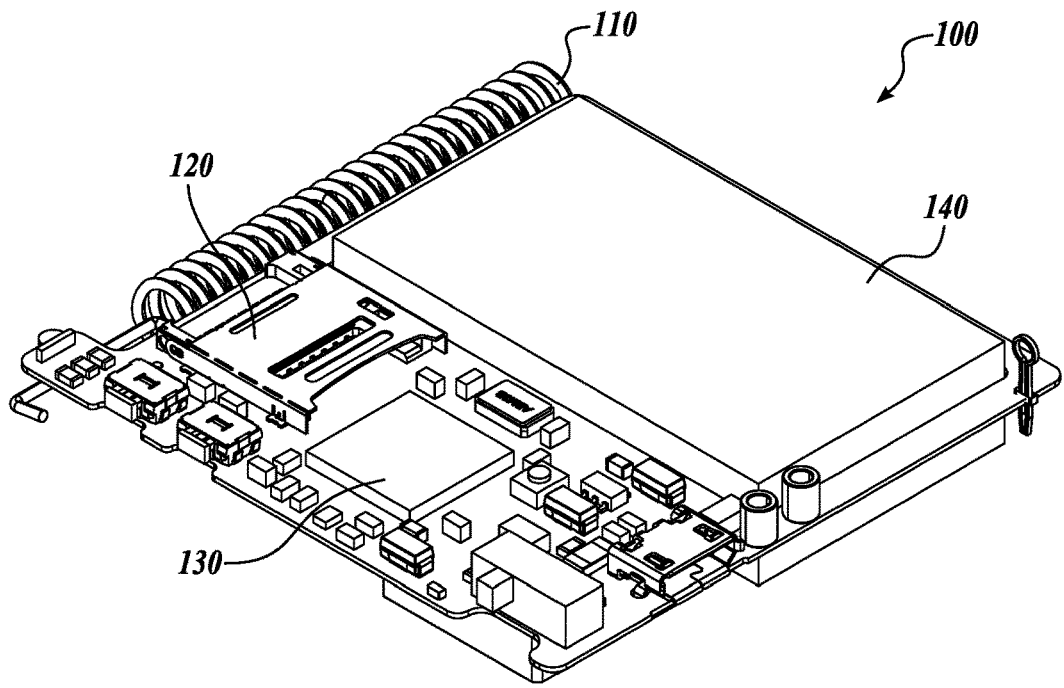
FIGS. 3A and 3B are isometric top and bottom views, respectively, of a PCB assembly of a tag in accordance with an embodiment of the present technology.
Figure 3B:
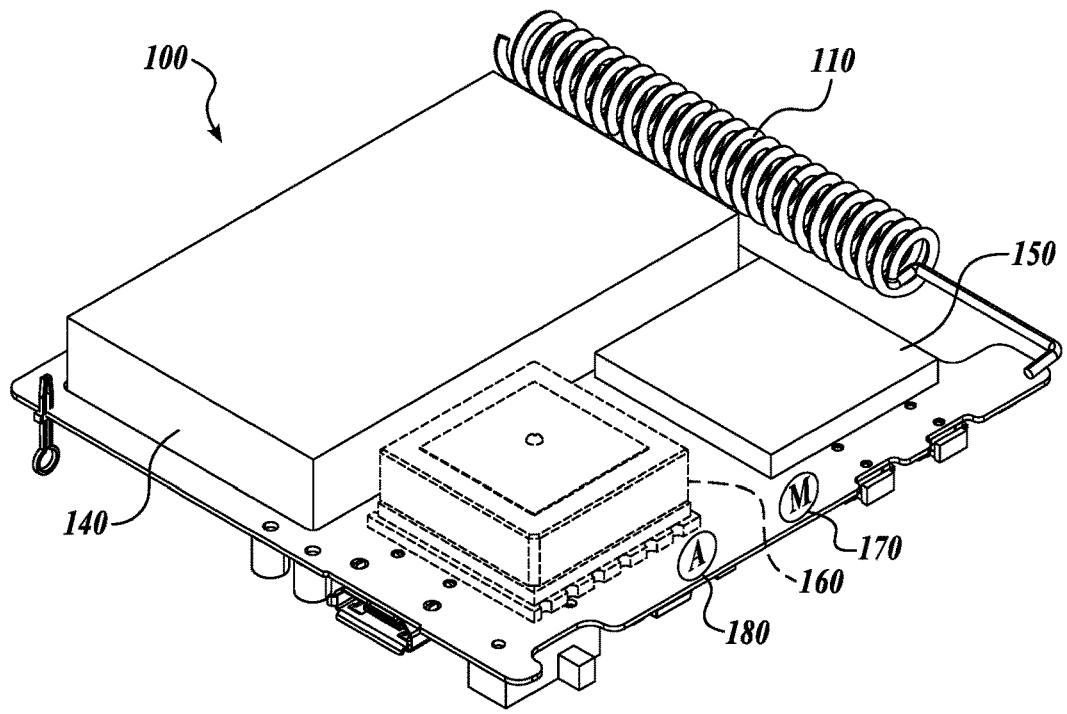

FIGS. 3A and 3B are isometric top and bottom views, respectively, of a PCB assembly of a tag in accordance with an embodiment of the present technology. In some embodiments, the tag 100 includes an antenna 110, a memory slot 120, a controller 130, a battery 140 and a radio module 210. In some embodiments, the tag 100 includes a GPS module 160 that is used for the network training purposes, as explained in more details below. Analogously to the station 200, the tag 100 may include an accelerometer 180 and/or magnetometer 170 that identify a relative orientation of the tag. In some embodiments, the battery 140 may have smaller capacity than the battery 240 of the station 200. Other implementations of the tag's PCB architecture are also possible, the illustrated PCB assembly being one of them.

Figure 4A:
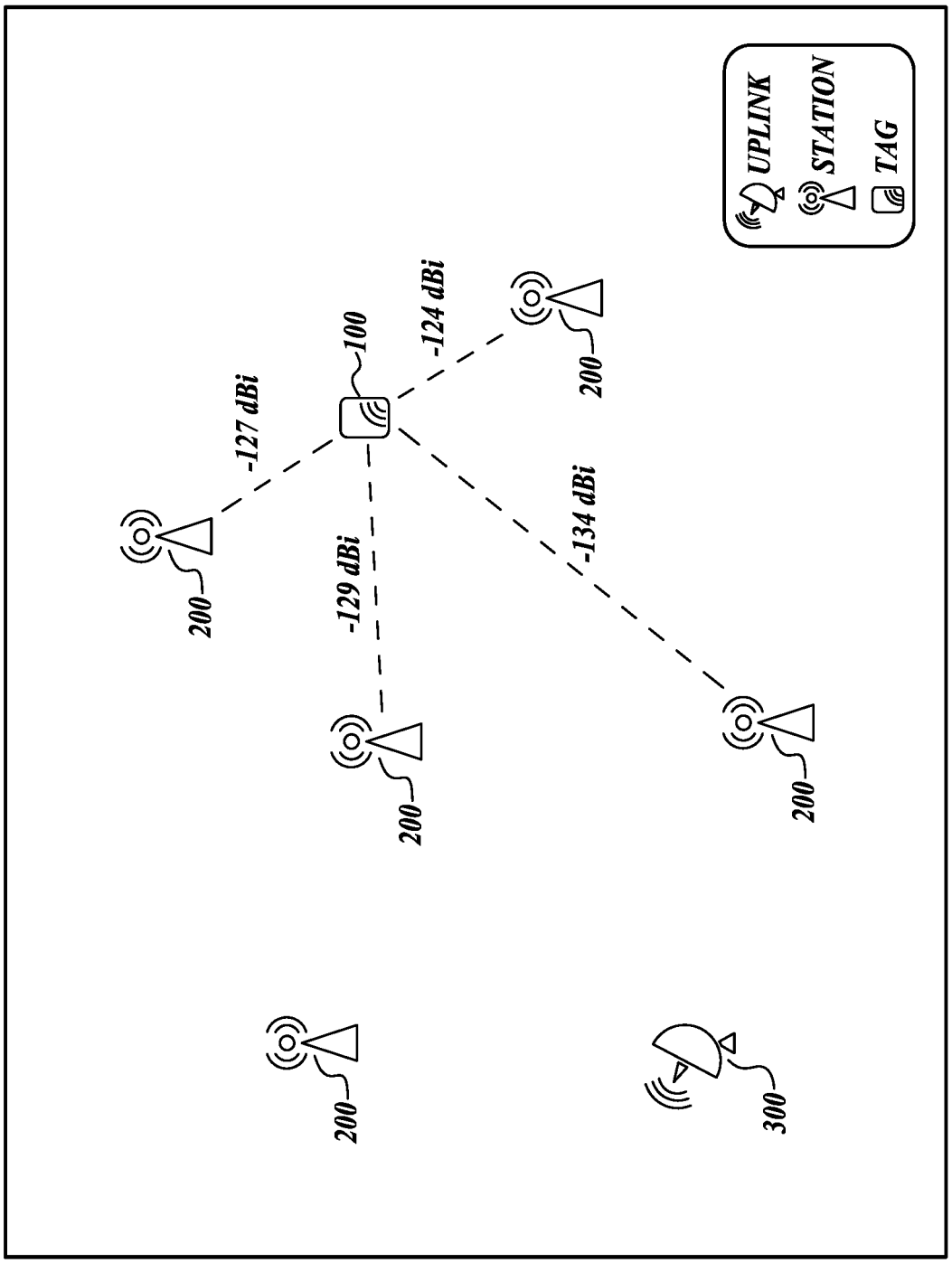
FIG. 4A is a schematic diagram of an arrangement of tags, base stations and uplinks in accordance with an embodiment of the present technology.

FIG. 4A is a schematic diagram of an arrangement of tags, base stations and an uplink in accordance with an embodiment of the present technology. The illustrated arrangement includes one tag 100, but in other embodiments, either during training or in real life application, multiple tags 100 may be used. In operation, the tag 100 emits radio signals that are received by stations 200. In some embodiments, a tag operates by waking from a low power sleep state and transmitting a packet of data consisting of its identifier as well as optional additional data such as tag orientation (e.g., accelerometer or magnetometer vector), and GPS location (in the event the tag is being used for system training and verification). The intensity of the received radio signal strength (RSSI) may depend on a distance between a particular station 200 and the tag 100, geographical features of the area, weather conditions, precipitation, etc. This packet of tag data is received by the stations 200 that are within a radio reception range of the tag 100. Each station then appends RSSI data to the tag information along with a timestamp and optional additional information such as the orientation of the station and GPS location of the station (in the event the station is mobile). In the context of this specification, the "timestamp" may refer to a real time or a chronological order. For example, a simple counting sequence can function as a "timestamp." The packets of tag data may be transferred from the individual stations 200 to an uplink 300, and further to a computing engine or database (not shown in FIG. 4A). In other embodiments, the packets of tag data may be first transferred from one station 200 to another, and then to the uplink 300, as discussed with respect to FIG. 4B below.

Figure 4B:
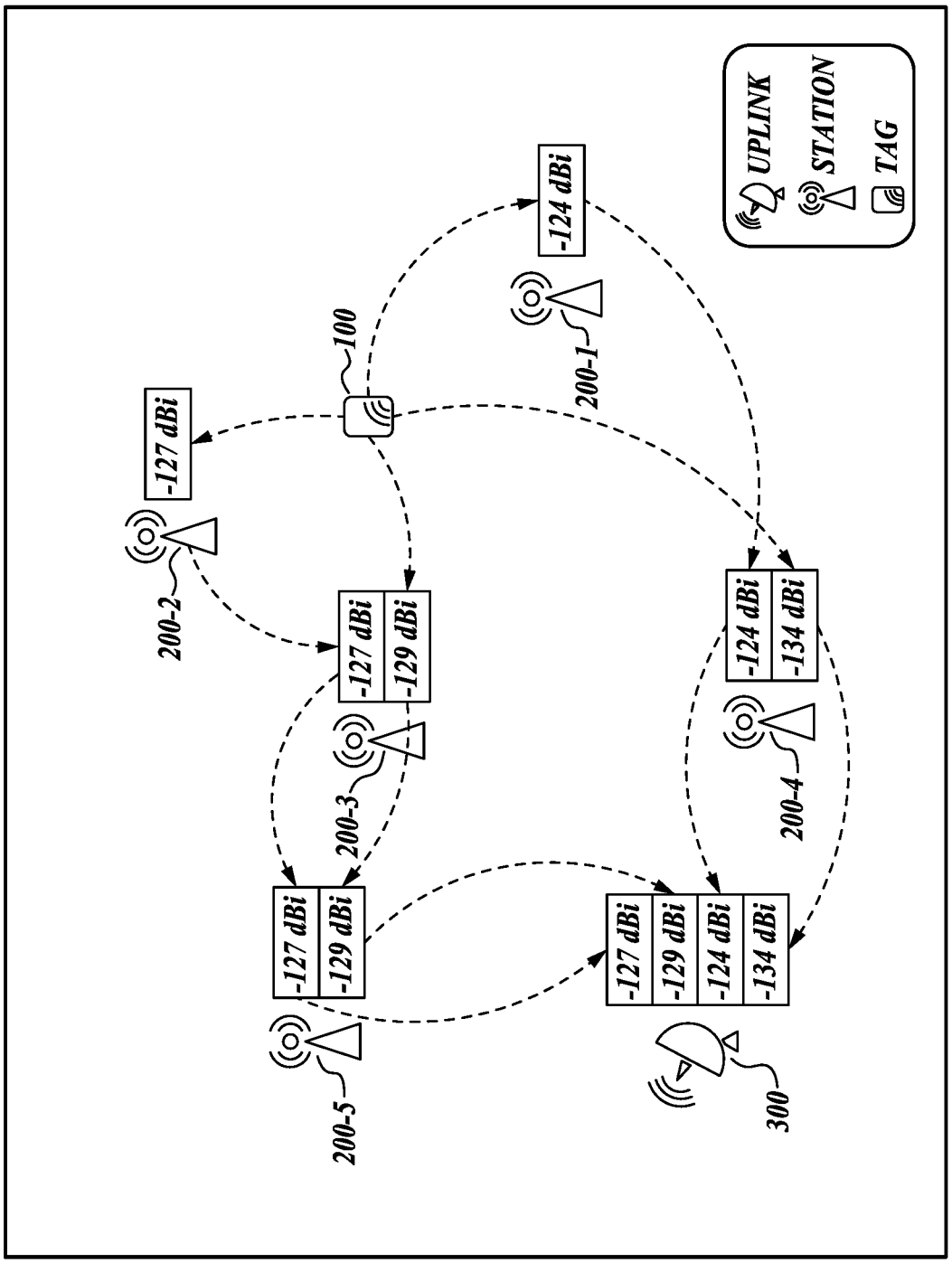
FIG. 4B is a schematic diagram of interactions among of tags, base stations and uplinks in accordance with an embodiment of the present technology.

FIG. 4B is a schematic diagram of interactions among of tags, base stations and an uplink in accordance with an embodiment of the present technology. As explained with respect to FIG. 4A above, the base stations collect packets of tag data that at least in part include the strength of tag's radio signal (RSSI). These packets of tag data may be chain-transferred from one station 200-$i$ to another station 200-$j$, before reaching the uplink 300. For example, a station 200-1 may transfer a packet of tag data that includes RSSI of −124 dBi to a station 200-4. Next, the station 200-4 further transfers that packet of tag data together with the packet received by the station itself (i.e., the RSSI of −134 dBi) to the uplink 300. Analogous process may take place among other stations in the illustrated arrangement.

Figure 5:
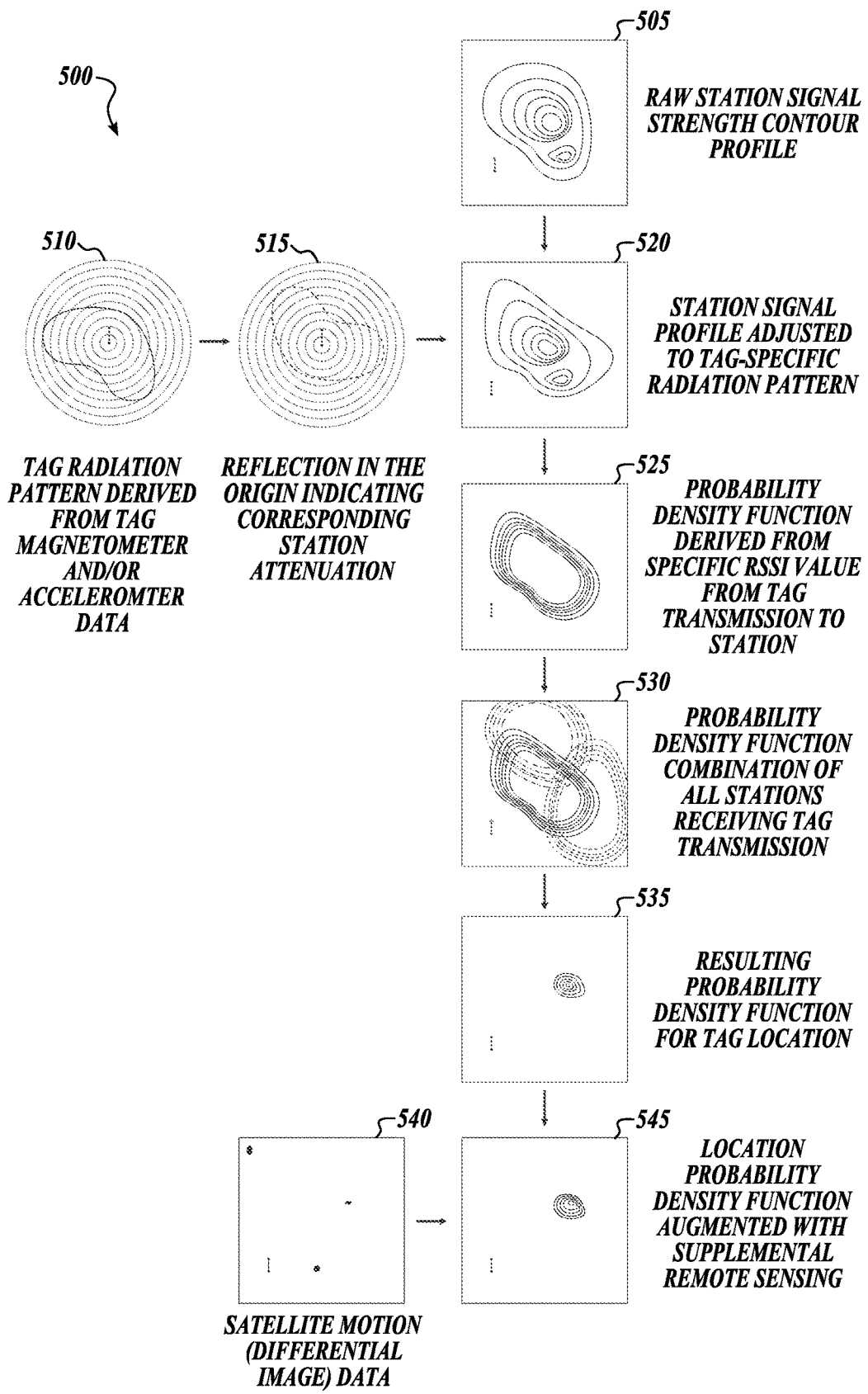
FIG. 5 is a flowchart of a method for determining tag location in accordance with an embodiment of the present technology.

FIG. 5 is a flowchart of a method for determining tag location in accordance with an embodiment of the present technology. Illustrated method may include more, fewer, or other steps. Additionally, steps may be performed in an order different from the illustrated one.

In block 505, strength contour profiles are assembled for individual stations based on strength of the radio signal received from the tags. These profiles may be assembled by the database.

In block 510, tag radiation pattern may be derived from the tag magnetometer 170 and/or tag accelerometer 180. In general, a tag may transmit data non-uniformly in different direction. Hence, the orientation of the tag may be transmitted in tag's data packet to further refine the PDF maps (described in more detail below). In block 515, a particular radiation pattern of the tag is indicated in the corresponding station attenuation.

In block 520, station signal profile is adjusted based on the tag-specific radiation pattern. As explained above, knowledge about the orientation of the tag may be derived from the tag magnetometer 170 and/or tag accelerometer 180.

In block 525, a probability density function (PDF) is derived from the specific RSSI value that a given station sensed for a given tag. In block 530, multiple PDFs are combined for the stations that received tag transmission. These PDFs may be curvilinear maps that take into account geography, temporal precipitation, temperature, vegetation, etc. of the local area. Generally, the PDFs are non-circular in view of the above-listed variables of the local area.

In block 535, tag location is determined as a resulting PDF from multiple station-specific PDFs. Such determination may be viewed as a PDF-based triangulation. However, more than three stations may be included in such 'triangulation.' Alternatively, fewer than three stations can also be used in "triangulation," the downside being a commensurate loss of accuracy. In some embodiments, even one station receiving the signal provides a positional PDF, but with the reduced accuracy.

In block 540, additional data may be provided by satellite imaging. In block 545, tag location is refined. For example, data received by the network may be used to refine signal strength probability maps estimated for each station based on geospatial data. Such data may include topographic variables derived from digital elevation models such as slope, aspect, and terrain curvature. Digital elevation models are publicly available for virtually everywhere on the earth's surface. The geospatial processing can be done in a variety of computational environments including proprietary Geographic. Information Systems (e.g., ESRI's ArcPro) or with open-source tools (e.g., R and Python). Other variables may include vegetation cover derived from satellite imagery and building footprint layers provided by private or public sources. The above method results in a predictive regional signal map based on data received by tags, geospatial modeling and remote sensing data.

In some embodiments, the PDFs can be manipulated and weighted as part of the triangulation process (also referred to as "intersecting"). For example, different weights may be associated with each PDF. Furthermore, in some embodiments both weights and maps may be adjusted based on real time data. As a non-limiting example, if the weather is extra humid, the computational engine 428 may scale the tag emission (block 510) to reflect reduced radio propagation in humid conditions.

Furthermore, the computational engine 428 can estimate the predictive power of these probability density maps both for the tag 100 and for the station 200. For instance, if a tag 100 were affixed to a small object that is too small to be seen in a satellite image, the computational engine 428 would quickly realize that the PDF in block 540 has relatively low predictive power for that tag, so the outcomes of blocks 535 and 545 would be close to each other. Furthermore, looking from a point of a station 200, if the station were in a region with heavy foliage the predictive power (and combinational weight) of block 540 could be further reduced by the computational engine 428. In some embodiments, the database 420 includes artificial intelligence and/or machine learning algorithms that enable the database 420 to discover over time that that, for example, block 540 has little predictive power for a tag or a station in a given location even without particular knowledge about the nature of the tagged object size or the nature of local tree canopy height.

Figure 6A:
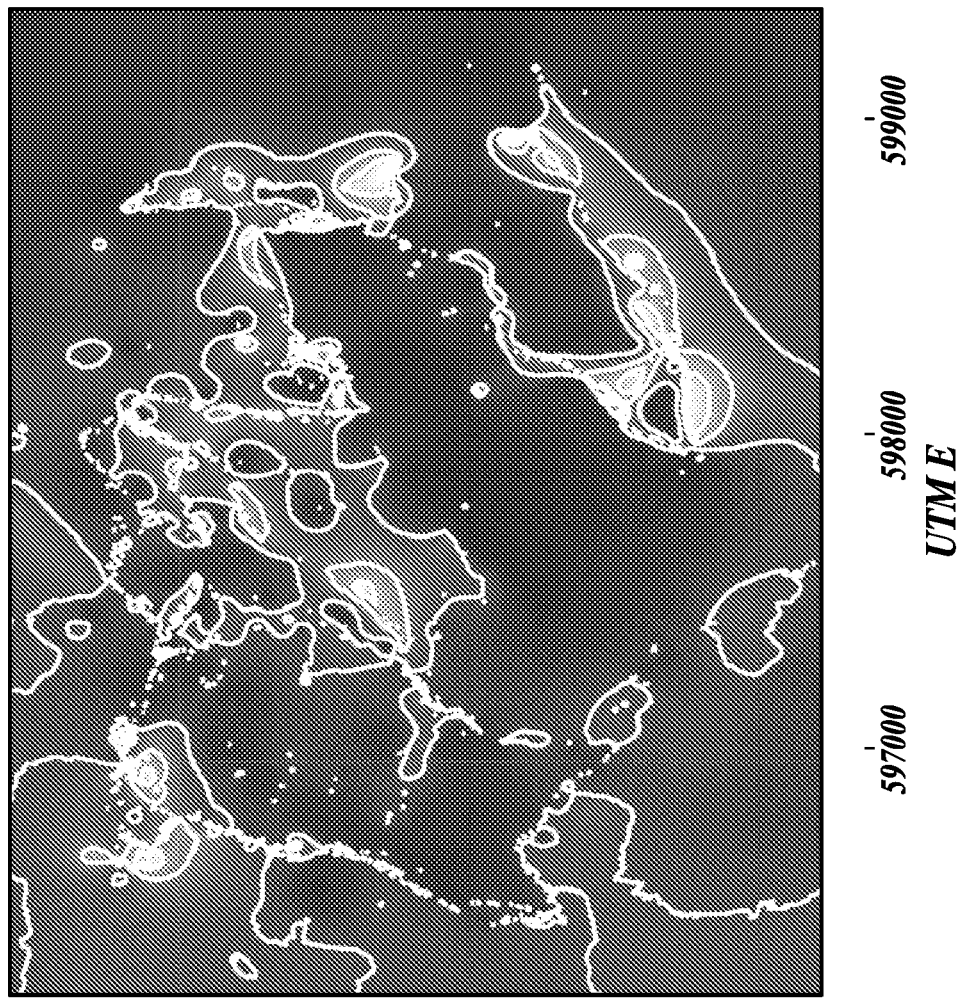
FIGS. 6A and 6B are graphs of signal strength recorded at two collocated stations in accordance with embodiments of the present technology.
Figure 6B:
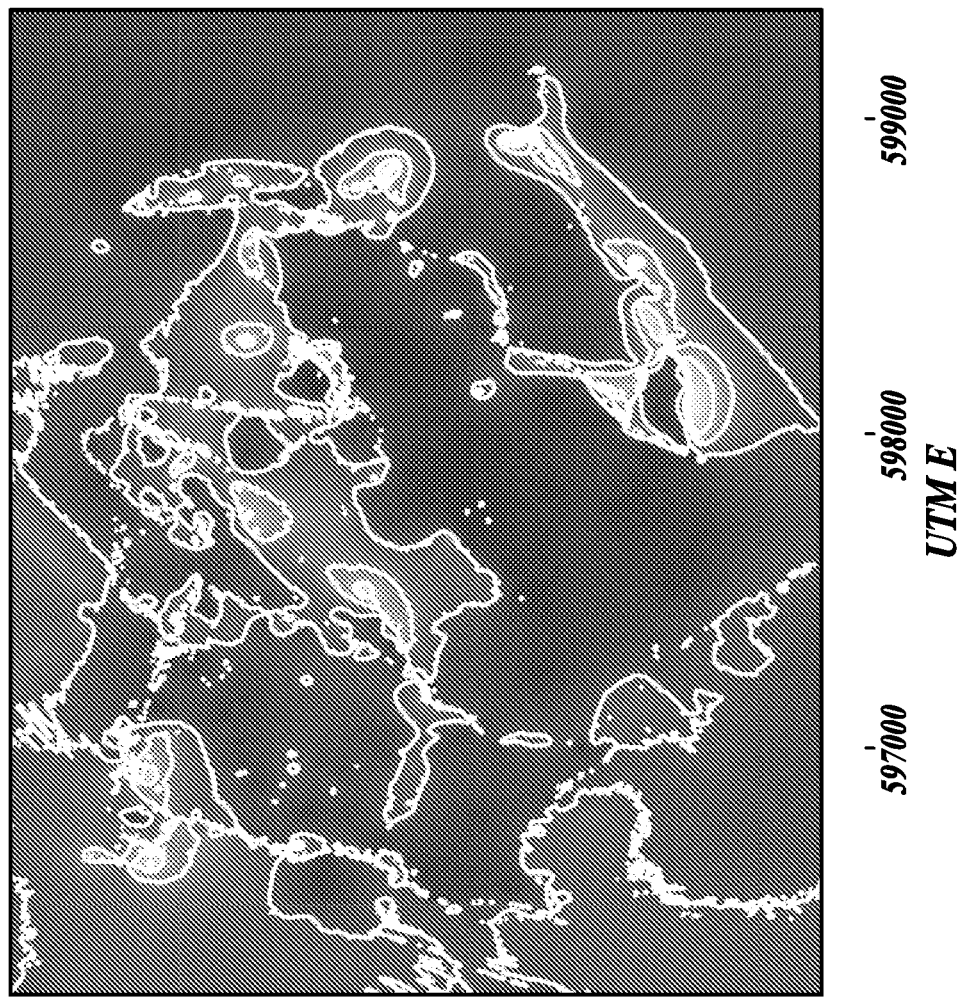

FIGS. 6A and 6B are graphs of signal strength recorded at two collocated stations in accordance with embodiments of the present technology. In general, the collocated stations should produce similar maps of RSSI, resulting in similar PDF values of the tag location. In the illustrated example, signal strength recorded at two collocated stations (STA13a and STA13b) show virtually identical (R2=0.92) patterns demonstrating the robustness of the inventive method in generating refined RSSI probability density maps.

Figure 7A:
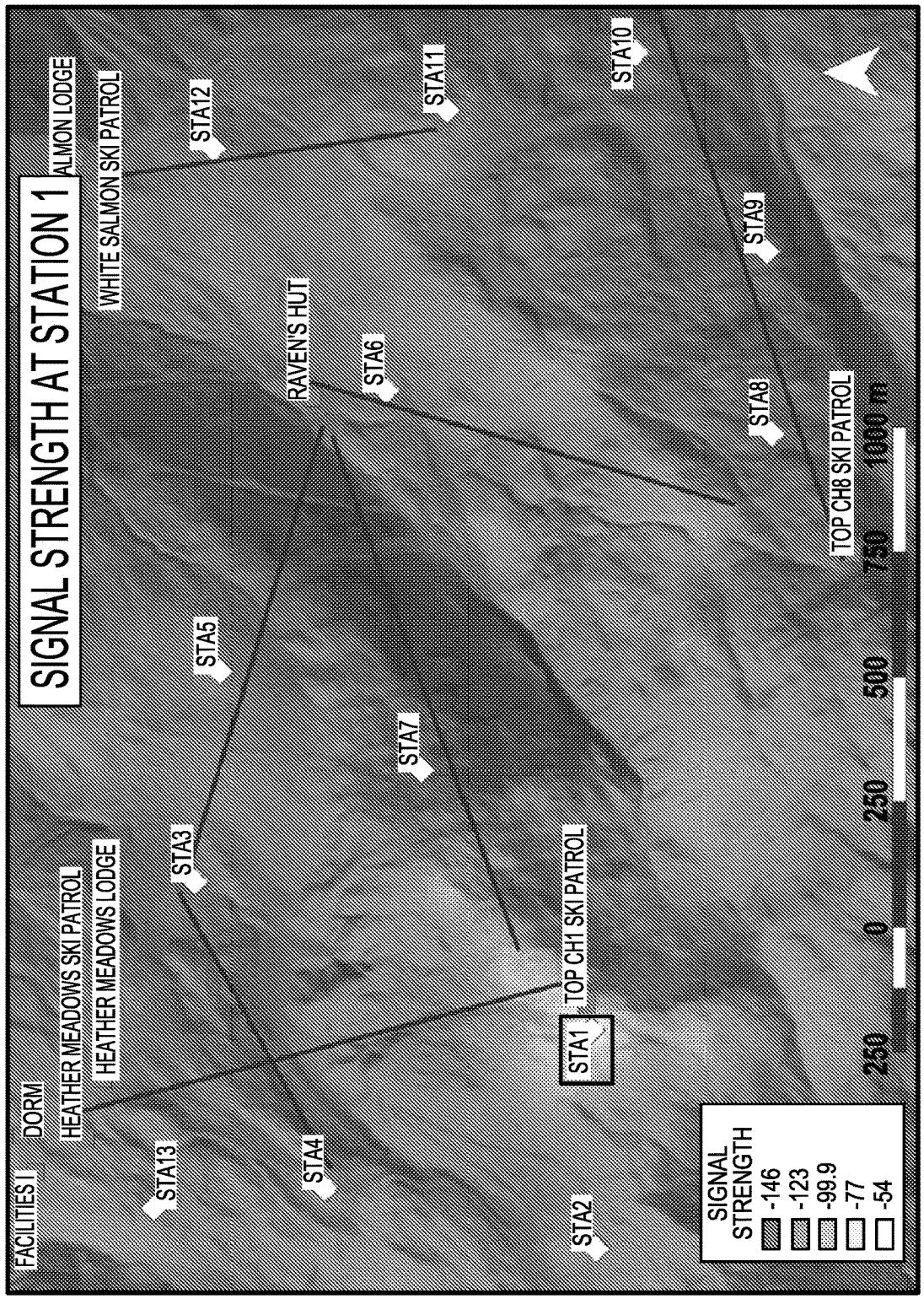
FIGS. 7A and 7B are graphs of signal strength at a sample base station in accordance with an embodiment of the present technology.
Figure 7B:
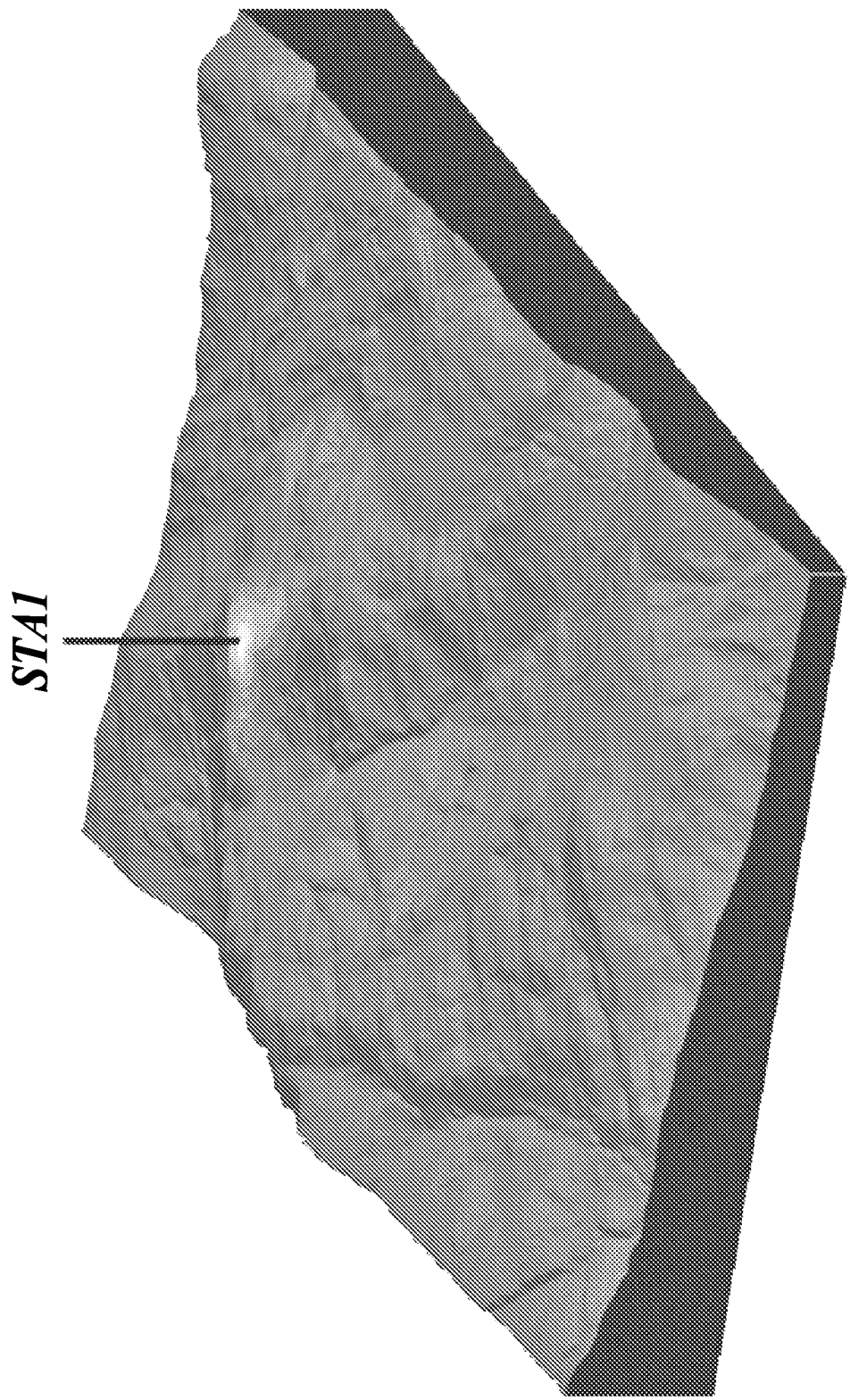

FIGS. 7A and 7B are graphs of interpolated signal strength at a sample base station in accordance with an embodiment of the present technology using data developed from a small pilot study. In operation, tags were moved around the study area. The modeled RSSI are based on data logged from these repositioned tags. Dark areas indicate locations where a tag would result in a high RSSI (low signal strength) for a given base station.

FIG. 7A illustrates signal strength recorded at a station (STA1). In particular, this station indicates low dBi values near the receiver itself with complex patterns in other locations as a function of environmental variables. Some examples of these environmental variables are topography, local weather conditions, local vegetation, etc.

FIG. 7B also shows signal strength recorded at the station STA1, however shown as a 3D drape looking SW (i.e., rotated with respect to FIG. 7A). In particular, the signal strength is high for tags located at the summit near the station. The signal strength then further varies with topography.

Figure 8:
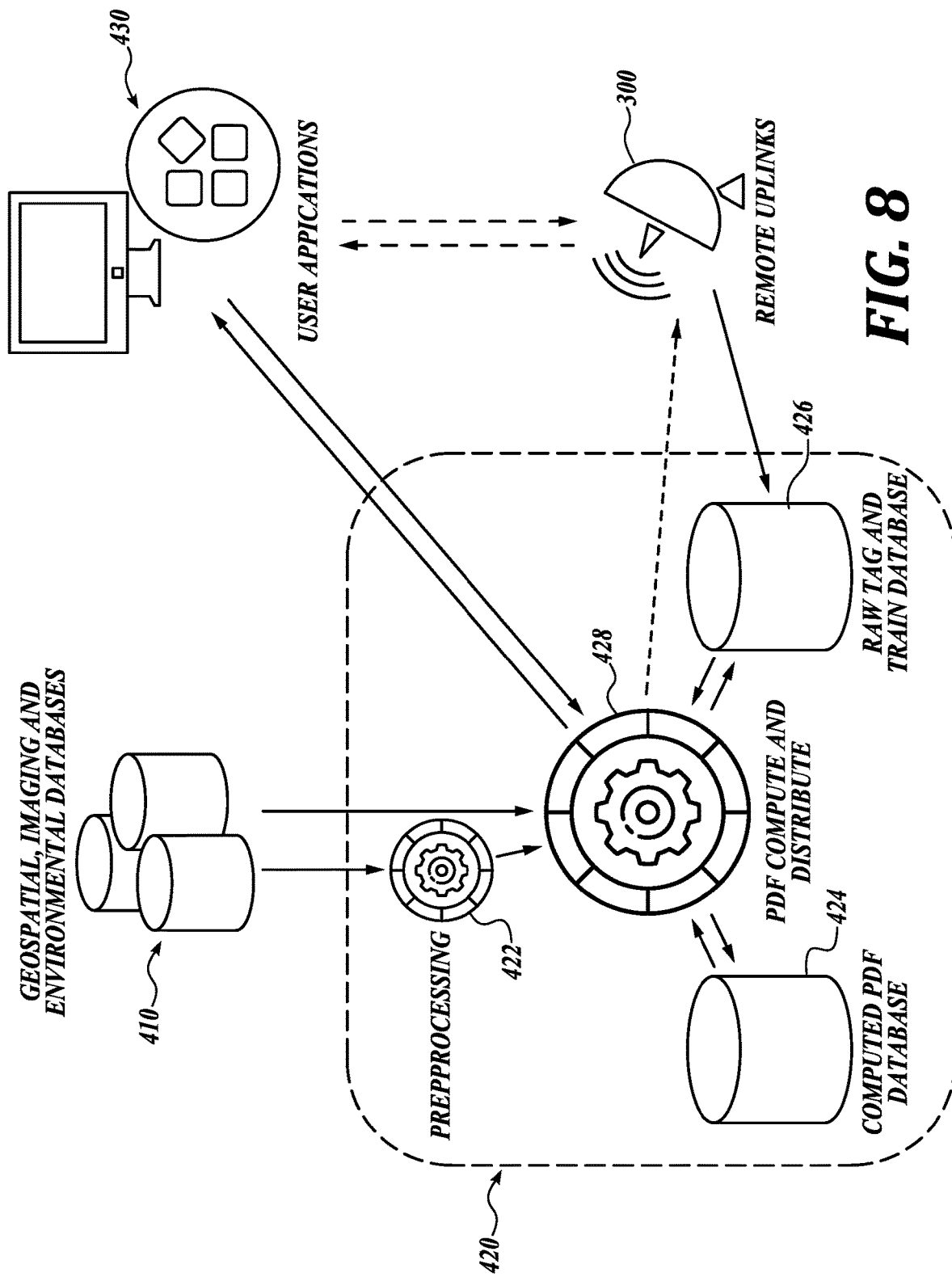
FIG. 8 is a schematic diagram of a database in accordance with an embodiment of the present technology.
Figure 9A:
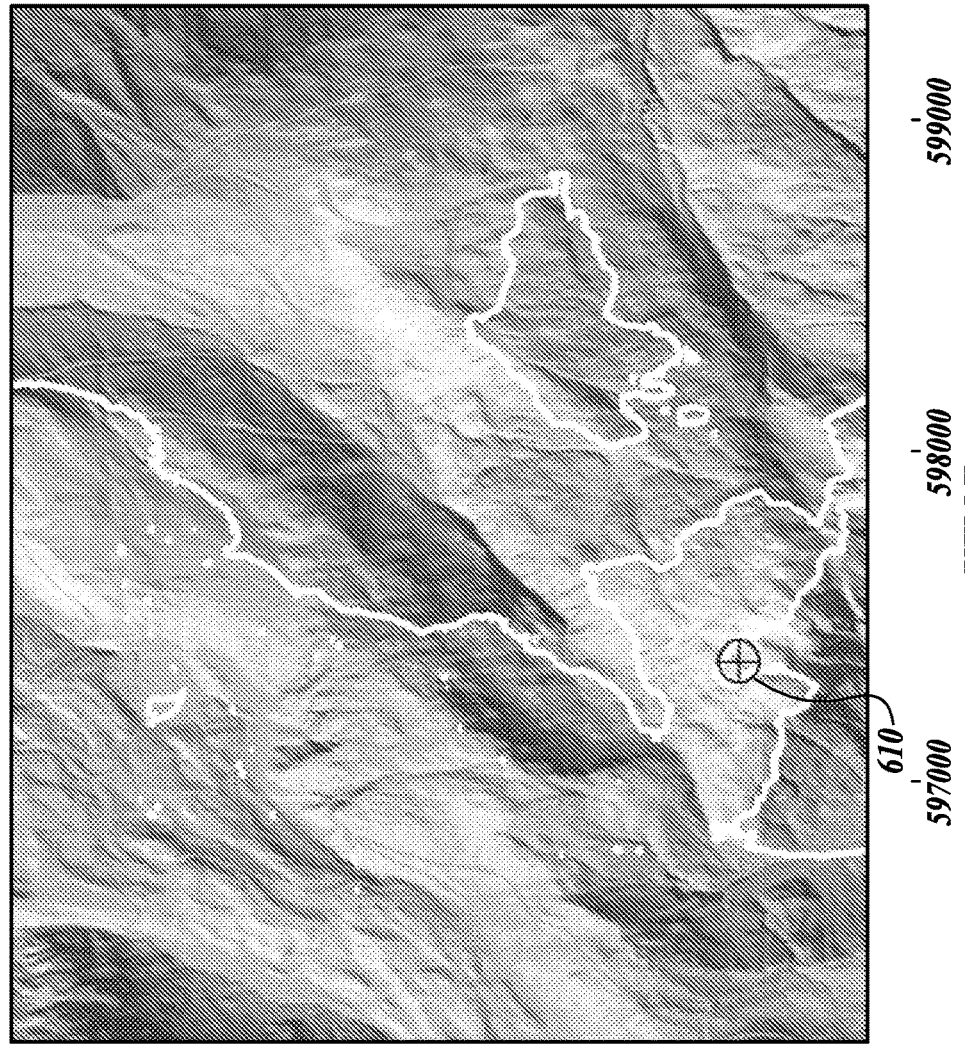
FIGS. 9A-9D are graphs of signal strength contours from four stations in accordance with an embodiment of the present technology.
Figure 9B:
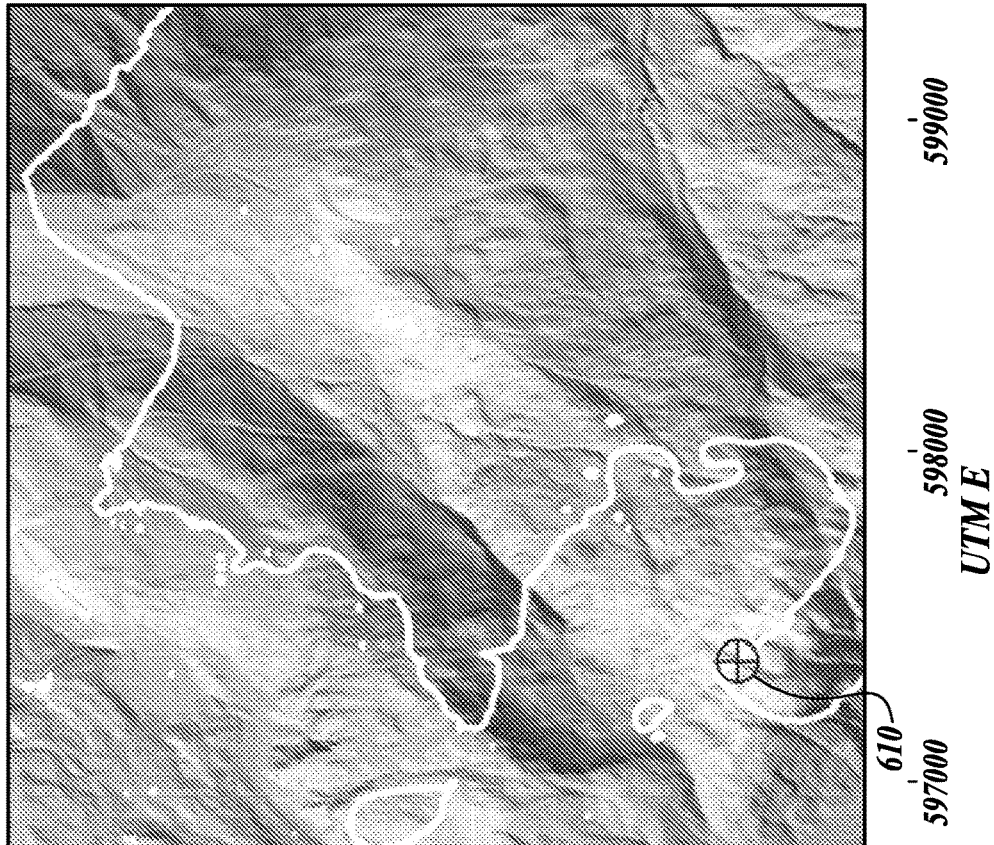
Figure 9C:
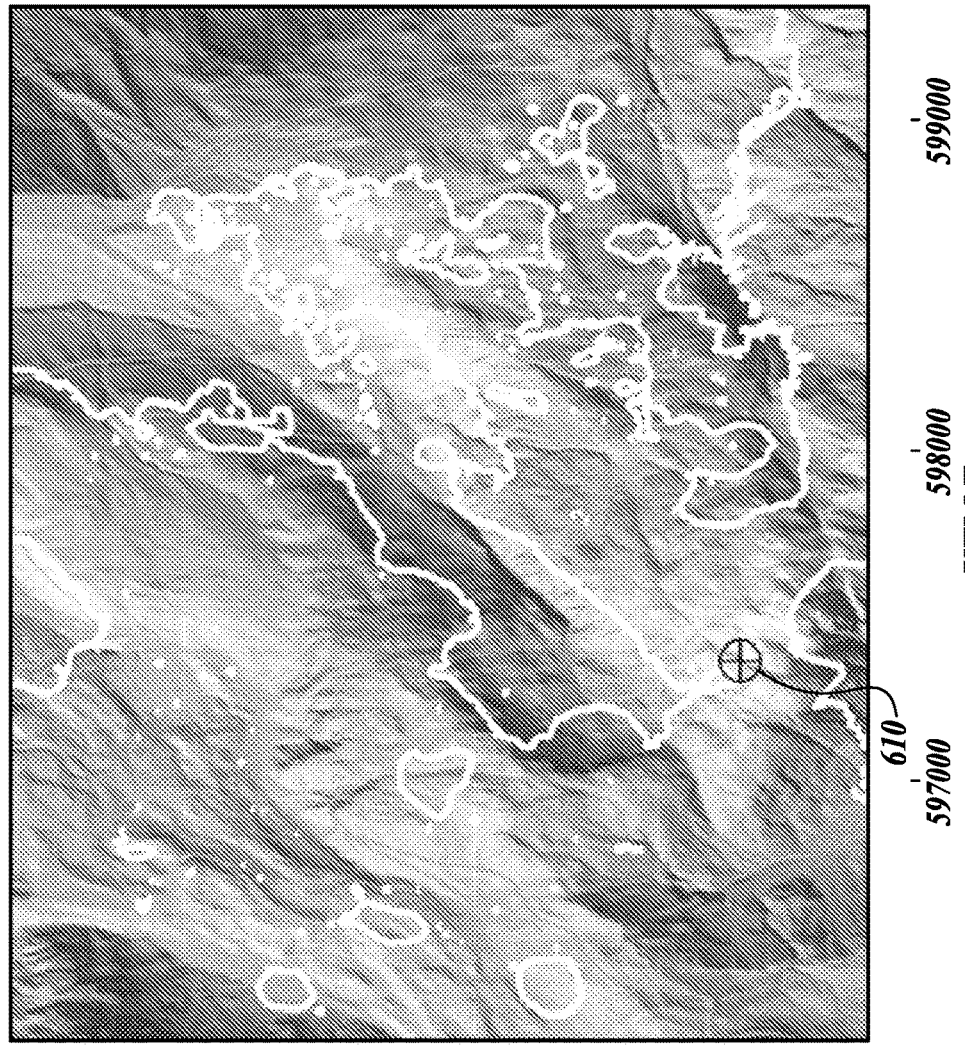
Figure 9D:
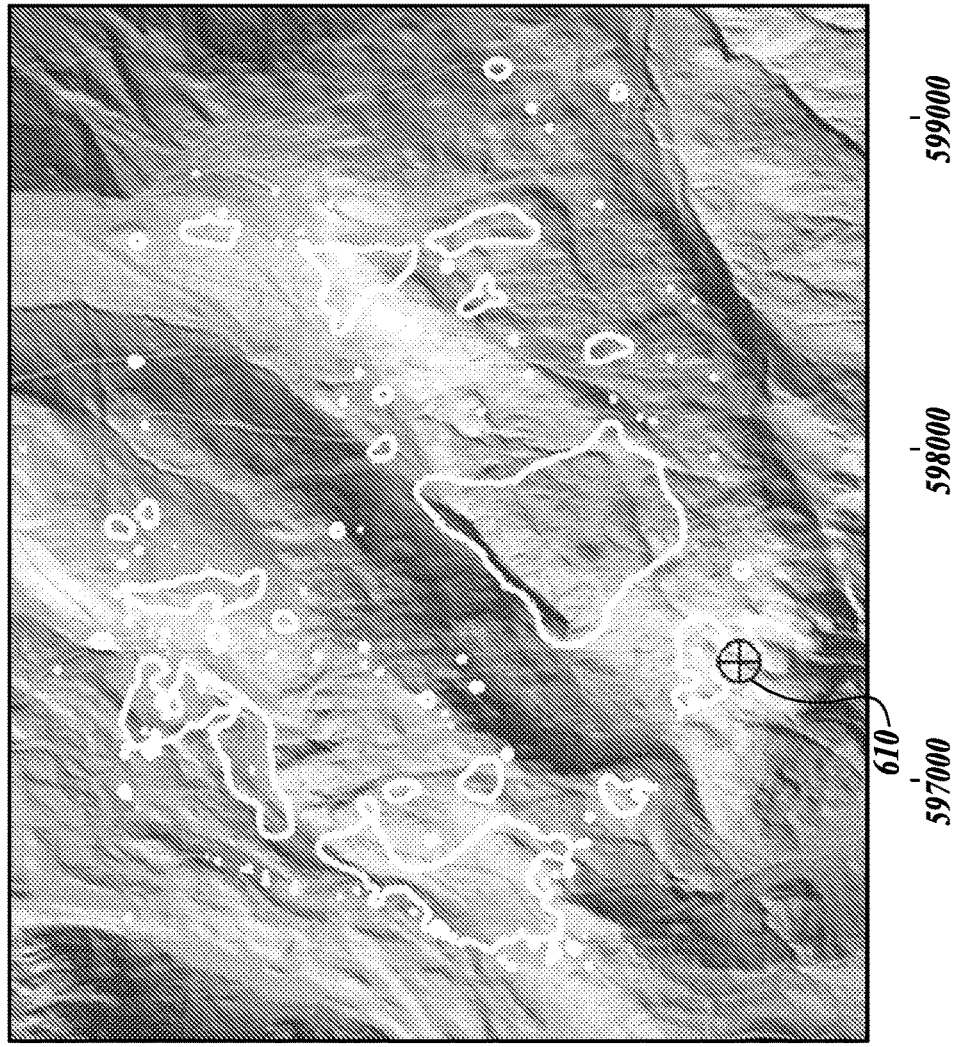

FIG. 8 is a schematic diagram of a database 420 in accordance with an embodiment of the present technology. In some embodiments, the database 420 includes a preprocessor 422, a computational engine 428 for computing and distributing PDFs, a raw tag and train database 426 and a computed PDF database 424 (collectively referred to as "database" for simplicity and brevity).

The preprocessor 422 and/or the computational engine 428 may be in communication with geospatial, imaging and environmental databases 410. Environmental and satellite imaging data may be used to further refine PDFs for tag location estimation, with a subset of these data inputs undergoing preprocessing for calibration, normalization, and predictive utility.

The database 426 may be in communication with the uplinks 300 to log data from the stations. The logged data is used by a PDF computation engine, along with geospatial, environmental, and imaging data to produce refined PDF maps in the computed PDF database 424. As explained above, these PDF maps predict tag location using station RSSI values corresponding to tag transmission events. Tag locations may be reported to user applications 430. Some examples of such user applications may be computer programs or apps that indicate tag location against a local map. Reduced size and resolution PDF maps are also exported to uplinks 300 for local (edge) computation of tag position and reporting to local user applications 430 (dashed lines) in the event of costly or intermittent uplink communication.

The database of aggregated tag signal measures, tag orientations (in orientation-enabled tags), and tag locations (in GPS-enabled training tags) may be used to refine probability density function (PDF) maps of the database 424 using statistical models (i.e., regression kriging) with data generated by geospatial data (database 410) as predictor variables. The PDF maps produced by this process estimate tag position and report results to client applications. The resulting PDF maps in the computing PDF database 424 represent a predictive regional signal map based on data received by tags, geospatial modeling and remote sensing data.

FIGS. 9A-9D are graphs of signal strength contours from four stations STA2, STA5, STA5 and STA 13, respectively, in accordance with an embodiment of the present technology using data developed from a small pilot study. FIGS. 9A-9D may be understood as an accuracy or calibration test for these four stations. In particular, signal strength contours from four stations (STA2, STA5, STA5, and STA 13) are shown as characterizing a tag in a given location. Contour lines in each Figure represent tag locations that would result in the observed signal strength. The intersection of those contour lines from all panels occurs only at the point marked by ⊕ on the map, which represents the true location of the tag, thus indicating accuracy of the inventive technology. This point ⊕ on the map corresponds to different RSSIs for different stations, ranging from about −133.75 dBi to about −124 dBi, all indicating the same PDF location of the tag. Therefore, when the tag is subsequently put in real use close to the point marked by ⊕ on the map, triangulation of the PDF maps should pinpoint the tag relatively close to its true location based on the dBi values of the tag's radio signal as sensed by STA2, STA5, STA5, and STA 13.

Many embodiments of the technology described above may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like).

From the foregoing, it will be appreciated that specific embodiments of the technology have been described herein for purposes of illustration, but that various modifications may be made without deviating from the disclosure. For example, in some embodiments the counter or controller may be based on a low-power buck regulator connected to a capacitor. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

The present application may also reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," etc., mean plus or minus 5% of the stated value.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

What is claimed is:

1. A method of locating tagged objects in remote regions, comprising:
   creating a signal strength probability density map by:
   transmitting first packets of data from at least one first tag to a plurality of stations,
   determining, by a plurality of stations, received signal strength indicator (RSSI) for received first packets of data,
   transmitting, by the plurality of stations, the RSSI to an uplink node,
   transmitting, by the uplink node, the RSSI to a database, and
   determining, by the database, the signal strength probability density map representative of probabilistic locations of the at least one first tag;
   transmitting second packets of data from a second tag to the plurality of stations; and
   based on the signal strength probability density map and the second packets of data from the second tag, determining a location of the second tag,
   wherein transmitting, by the plurality of stations, the RSSI to an uplink node comprises:
   receiving the RSSI by a first station of the plurality of stations;
   transmitting the RSSI from the first station of the plurality of stations to a second station of the plurality of stations; and
   transmitting the RSSI from the second station of the plurality of stations to the uplink,
   wherein determining the signal strength probability density map comprises:
   determining a raw signal strength contour profile of the at least one first tag as received by the plurality of stations;
   determining an individual tag radiation pattern of the at least one first tag; and
   determining an adjusted station signal profile based on a combination of the raw signal strength contour profile of the at least one first tag and the individual tag radiation pattern of the at least one first tag.

2. The method of claim 1, wherein transmitting the first packets of data from at least one first tag to the plurality of stations comprises:

waking the at least one first tag from a low power sleep state; and after transmitting the first packets of data, entering the low power sleep state by the at least one first tag.

3. The method of claim 1, wherein the first packets of data sent by at least one first tag comprise:
an identifier;
a timestamp;
a global positioning system (GPS) location; and
orientation data.

4. The method of claim 1, further comprising commanding the at least one first tag to function as a beacon.

5. The method of claim 1, wherein the at least one first tag and the second tag are radio transceiver tags.

6. The method of claim 1, further comprising:
bi-directionally communicating between at least one station of the plurality of stations and the second tag.

7. The method of claim 1, further comprising:
determining orientation of individual first tags by their respective 3-axis accelerometers.

8. The method of claim 1, wherein determining the individual tag radiation pattern of the at least one first tag is based on a tag magnetometer or a tag accelerometer data.

9. The method of claim 1, wherein determining, by the database, the signal strength probability density map representative of probabilistic locations of the at least one first tag comprises:
generating, by the database, individual probability density maps for each station of the plurality of stations; and
intersecting the individual probability density maps of each station of the plurality of stations to generate the signal strength probability density map representative of probabilistic locations of the at least one first tag.

10. A method of locating tagged objects in remote regions, comprising:
creating a signal strength probability density map by:
transmitting first packets of data from at least one first tag to a plurality of stations,
determining, by a plurality of stations, received signal strength indicator (RSSI) for received first packets of data,
transmitting, by the plurality of stations, the RSSI to an uplink node,
transmitting, by the uplink node, the RSSI to a database, and
determining, by the database, the signal strength probability density map representative of probabilistic locations of the at least one first tag;
transmitting second packets of data from a second tag to the plurality of stations; and
based on the signal strength probability density map and the second packets of data from the second tag, determining a location of the second tag,
wherein transmitting, by the plurality of stations, the RSSI to an uplink node comprises:
receiving the RSSI by a first station of the plurality of stations;
transmitting the RSSI from the first station of the plurality of stations to a second station of the plurality of stations;
transmitting the RSSI from the second station of the plurality of stations to the uplink;
receiving, by the database, environmental and satellite imaging data; and
refining the signal strength probability density map based on the environmental and satellite imaging data.

11. A system of locating tagged objects in remote regions, comprising:
at least one first tag configured to transmit first packets of data;
a plurality of stations configured to receive the first packets of data and to determine received signal strength indicator (RSSI) for the received packets of data;
an uplink node configured to receive the RSSIs from the plurality of stations;
a database configured to receive the RSSIs and to determine a signal strength probability density map based on the received RSSIs; and
at least one second tag configured to transmit second packets of data to the plurality of stations,
wherein the database is configured to determine a location of the second tag based on the signal strength probability density map and the second packets of data transmitted by the second tag,
wherein the database is further configured to:
determine a raw signal strength contour profile of the at least one first tag as received by the plurality of stations;
determine an individual tag radiation pattern of the at least one first tag; and
determine an adjusted station signal profile based on a combination of the raw signal strength contour profile of the at least one first tag and the individual tag radiation pattern of the at least one first tag.

12. The system of claim 11, wherein the first packets of data sent by each first tag comprise:
an identifier;
a timestamp;
a global positioning system (GPS) location; and
orientation data.

13. The system of claim 11, wherein at least one station of the plurality of stations is configured for bi-directional communication with the second tag.

14. The system of claim 11, wherein the at least one first tag is configured to enter a low power sleep state after transmitting the first packets of data.

15. The system of claim 11, wherein individual stations of the plurality of stations and the uplink node are housed in weatherproof enclosures.

16. The system of claim 11, wherein individual stations of the plurality of stations comprise 3-axis accelerometers for determining orientation of the station.

17. The system of claim 11, wherein the individual tag radiation pattern of the at least one first tag is based on a tag magnetometer or a tag accelerometer data.

18. The system of claim 11, wherein the database is further configured to:
generate individual probability density maps for each station of the plurality of stations; and
intersect the individual probability density maps of each station of the plurality of stations to generate the signal strength probability density map representative of probabilistic locations of the at least one first tag.

19. A method of locating tagged objects in remote regions, comprising:
creating a signal strength probability density map by:
transmitting first packets of data from at least one first tag to a plurality of stations,
determining, by a plurality of stations, received signal strength indicator (RSSI) for received first packets of data, transmitting, by the plurality of stations, the RSSI to an uplink node, transmitting, by the uplink node, the RSSI to a database, and determining, by the database, the signal strength probability density map representative of probabilistic locations of the at least one first tag;

transmitting second packets of data from a second tag to the plurality of stations; and based on the signal strength probability density map and the second packets of data from the second tag, determining a location of the second tag, wherein determining the signal strength probability density map comprises:

determining a raw signal strength contour profile of the at least one first tag as received by the plurality of stations;

determining an individual tag radiation pattern of the at least one first tag; and determining an adjusted station signal profile based on a combination of the raw signal strength contour profile of the at least one first tag and the individual tag radiation pattern of the at least one first tag.

* * * * *

UNITED STATES PATENT AND TRADEMARK OFFICE
CERTIFICATE OF CORRECTION

| | |
|---|---|
| PATENT NO. | : 11,808,873 B2 |
| APPLICATION NO. | : 17/995399 |
| DATED | : November 7, 2023 |
| INVENTOR(S) | : D. Wallin et al. |

It is certified that error appears in the above-identified patent and that said Letters Patent is hereby corrected as shown below:

On the Title Page

Abstract/Line 4 change "map by." to -- map. --

Signed and Sealed this
Second Day of July, 2024

Katherine Kelly Vidal
*Director of the United States Patent and Trademark Office*